(12) United States Patent
Khandekar et al.

(10) Patent No.: US 7,623,490 B2
(45) Date of Patent: Nov. 24, 2009

(54) SYSTEMS AND METHODS THAT UTILIZE A CAPACITY-BASED SIGNAL-TO-NOISE RATIO TO PREDICT AND IMPROVE MOBILE COMMUNICATION

(75) Inventors: Aamod Khandekar, San Diego, CA (US); Avneesh Agrawal, San Diego, CA (US); Arak Sutivong, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 646 days.

(21) Appl. No.: 11/021,697

(22) Filed: Dec. 22, 2004

(65) Prior Publication Data

US 2006/0135080 A1 Jun. 22, 2006

(51) Int. Cl.
*H04W 4/00* (2009.01)
(52) U.S. Cl. ...................................... 370/329; 370/335
(58) Field of Classification Search ................ 370/329, 370/335; 455/450–453
See application file for complete search history.

(56) References Cited

U.S. PATENT DOCUMENTS

| | | | | |
|---|---|---|---|---|
| 6,072,779 A * | 6/2000 | Tzannes et al. | ............ | 370/252 |
| 6,532,258 B1 * | 3/2003 | Goldston et al. | ........... | 375/227 |
| 6,567,459 B1 * | 5/2003 | Hakkinen et al. | ........... | 375/132 |
| 6,636,568 B2 * | 10/2003 | Kadous | ...................... | 375/225 |
| 2002/0101832 A1 * | 8/2002 | Chen et al. | ................. | 370/318 |
| 2003/0003880 A1 * | 1/2003 | Ling et al. | .................... | 455/92 |
| 2003/0224836 A1 * | 12/2003 | Tsai et al. | ................... | 455/573 |
| 2006/0008020 A1 * | 1/2006 | Blankenship et al. | ...... | 375/261 |

FOREIGN PATENT DOCUMENTS

EP 1453263 9/2004

OTHER PUBLICATIONS

Kim et al., "On Efficient Link Error Prediction Based on Convex Metrics," Vehicular Technology Conference, IEEE (2004).
International Preliminary Report on Patentability-PCT/US05/046687-The International Bureau of WIP0-Jun. 26, 2007.

(Continued)

*Primary Examiner*—Lester Kincaid
*Assistant Examiner*—Steven Lim
(74) *Attorney, Agent, or Firm*—Sandip S. Minhas; Stanton Braden

(57) ABSTRACT

Techniques for utilizing a capacity-based effective signal-to-noise ratio (SNR) to improve wireless communication are described herein. In an embodiment, a mobile terminal can determine the effective SNR from a forward link channel using pilot/data symbols. The mobile terminal can convey the effective SNR to a base station. In order to minimize transmission overhead, the mobile terminal can quantize the effective SNR prior to transmitting it to the base station. In another embodiment, the base station can determine the effective SNR from a reverse link. The base station can utilize the effective SNR to facilitate scheduling transmissions from the mobile terminal, transmitting power control commands to the mobile terminal, and determining a supporting data rate for the mobile terminal, for example. Suitable SNRs include constrained, unconstrained, average, and/or approximated effective SNRs. In addition, various filters, such as an averaging filter, can be utilized to further process the effective SNR.

9 Claims, 12 Drawing Sheets

OTHER PUBLICATIONS

Written Opinion-PCT/US05/046687-European Patent Office-May 8, 2006.

International Search Report-PCT/US05/046687-European Patent Office-May 8, 2006.

* cited by examiner

SYSTEMS AND METHODS THAT UTILIZE A CAPACITY-BASED SIGNAL-TO-NOISE RATIO TO PREDICT AND IMPROVE MOBILE COMMUNICATION

BACKGROUND

I. Field

The embodiments herein generally relate to communication, and more specifically to systems and methods that determine and utilize a capacity-based effective signal-to-noise ratio (SNR) as a performance metric to in a wireless communication system.

II. Background

Conventional technologies utilized for transmitting information within a mobile communication network (e.g., a cell phone network) include frequency, time and code division based techniques. In general, with frequency division based techniques calls are split based on a frequency access method, wherein respective calls are placed on a separate frequency. With time division based techniques, respective calls are assigned a certain portion of time on a designated frequency. With code division based techniques respective calls are associated with unique codes and spread over available frequencies. Respective technologies can accommodate multiple accesses by one or more users.

More particularly, frequency division based techniques typically separate the spectrum into distinct channels by splitting it into uniform chunks of bandwidth. For example, division of the frequency band allocated for wireless cellular telephone communication can be split into 30 channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of the discrete frequencies available at any time in a range. In general, data is digitized and spread over available bandwidth, wherein multiple calls can be overlaid on the channel and respective calls can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals. Thus, there is need to mitigate the effects of channel and/or interference power variations in order to improve communication in the presence of such variations.

SUMMARY

The systems and methods described herein relate to utilizing a capacity-based effective signal-to-noise ratio (SNR) to facilitate wireless communication (e.g., OFDMA, OFDM, FDMA, FDM, TDMA CDMA, etc.) are described herein. This effective SNR can be employed as a performance metric that provides for a good prediction of turbo code performance. For example, when channel and interference power varies over a duration of a single codeword, the error probability of that codeword can be accurately predicted through the capacity-based effective SNR of a set of modulation symbols spanning that codeword. In general, the capacity-based effective SNR for the set of modulation symbols can be defined over the set of modulation symbols and can be based on a constrained capacity function corresponding to a particular modulation scheme. Approximations to the constrained capacity function can be utilized if necessary or desired. One suitable approximation is the unconstrained Gaussian capacity (e.g., assuming Additive White Gaussian Noise (AWGN)). A further simplification would be to approximate the unconstrained capacity, or log(1+SNR) by log(SNR). Under this formulation, the capacity-based effective SNR becomes the geometric mean of individual SNRs. It is to be appreciated that this capacity-based effective SNR can be utilized with non-Gaussian (non-Normal) channels by adapting the capacity function to the channel of interest.

In one embodiment, a mobile terminal of a wireless communication system can determine (e.g., measure, compute, etc.) the capacity-based effective SNR of a forward link signal. For example, the mobile terminal can determine the constrained effective SNR of its forward link channel using pilot/data symbols and convey this SNR back to the base station. Since different modulation schemes can be utilized for forward link transmission and the mobile terminal may be unaware of which scheme is being utilized, the mobile terminal can determine an unconstrained effective SNR instead of the constrained effective SNR. In order to minimize transmission overhead, the mobile terminal can quantize the effective SNR to a small number of values, which may (e.g., uniform quantization) or may not (e.g., non-uniform quantization) be equally spaced. In addition, the mobile terminal can employ a suitable averaging filter when determining the effective SNR.

In another embodiment, a base station of a wireless communication system can determine the capacity-based effective SNR. For example, the base station can determine the effective SNR from a transmission from a mobile terminal.

Such determination can be performed even when the mobile terminal sporadically transmits data. Similar to the mobile terminal, the base station can employ various averaging filters in connection with determining the effective SNR. The base station can selectively choose an averaging filter based on a purpose (e.g., scheduling, power control and data rate, as described below), an SNR accuracy, and a frequency at which the base station desires to respond to the instantaneous fade realization.

The base station can utilize the effective SNR to schedule transmissions from the mobile terminal, transmit power control commands to the mobile terminal, and determine the data rate supported by the mobile terminal, for example. Scheduling transmissions can include rendering scheduling decisions for multi-user diversity, for example, scheduling a given user when an associated channel condition is favorable in order to maximize system capacity. Transmitting power control commands can include adjusting power to a mobile terminal in order to achieve a desired channel quality (in terms of SNR) at a succeeding transmission. Determining a supporting rate can include predicting a supporting rate based on a modulation scheme and code rate.

It is to be appreciated that if the communication system utilizes a reuse scheme in which different portions of the spectrum (commonly referred to as reuse sets) have different channel qualities, the mobile terminal can transmit Channel Quality Control Indicators (CQIs) for each of the different reuse sets, the last reuse set utilized, or the best reuse set. In addition, when interference power varies slower than channel power, an effective "C" measurement can be obtained at a fast rate and several effective "I" measurements can be obtained at a lower rate in order to conserve reverse link bandwidth. An effective "C" measurement is an effective SNR computation using a measured channel (C) value and a nominal interference (I) value, and an effective "I" measurement is an effective SNR computation using a measured interference (I) value and a nominal channel (C) value. Moreover, an effective "C/Average I" measurement can be utilized when it is determined that an average interference power over the modulation symbols, rather than an interference power measurement for individual modulation symbols, is desired. The effective "C/Average I" measurement is an effective SNR computation utilizing actual channel values for each modulation symbol and the average interference value.

In other embodiments, systems and methods that facilitate wireless communication are illustrated. In one instance, a method is provided that includes receiving information associated with a forward link at a mobile terminal, the information includes channel related information and power related information, determining an effective SNR from the received information, conveying the effective SNR to a base station, and utilizing the effective SNR to facilitate wireless communication. In another instance, a method is provided that includes obtaining reverse link channel and interference power variations at a base station, computing a capacity-based effective SNR from the received information, and utilizing the capacity-based effective SNR to facilitate wireless communication. In yet another instance, a system is provided that includes a first component that determines a capacity based effective signal-to-noise ratio (SNR) and a second component that employs the effective SNR to facilitate scheduling transmissions, providing power control commands and/ or predicting a transmission supporting rate.

Various aspects and embodiments are described in further detail below.

DETAILED DESCRIPTION

The techniques described herein can be utilized in connection with forward and reverse links of various devices to facilitate wireless communication. A forward link (or downlink) generally refers to communication from a base station to a mobile terminal, and a reverse link (or uplink) generally refers to communication from a mobile terminal to a base station. A typical base station is a multi-channel two-way radio residing at a fixed location, and a typical mobile terminal (e.g., a mobile phone, portable phone, wireless phone, cell phone, etc.) is a single-channel two-way radio that communicates with a base station or other mobile terminals through a base station through radio-frequency (RF). The techniques provide for determining a capacity-based effective signal-to-noise ratio (SNR) at a mobile terminal and/or a base station and utilizing the effective SNR to facilitate scheduling transmissions from the mobile terminal, transmitting power control commands to the mobile terminal, and determining a supporting data for the mobile terminal, for example. The techniques can be utilized with OFDMA, OFDM, FDMA, FDM, TDMA CDMA, and the like.

Figure 1:
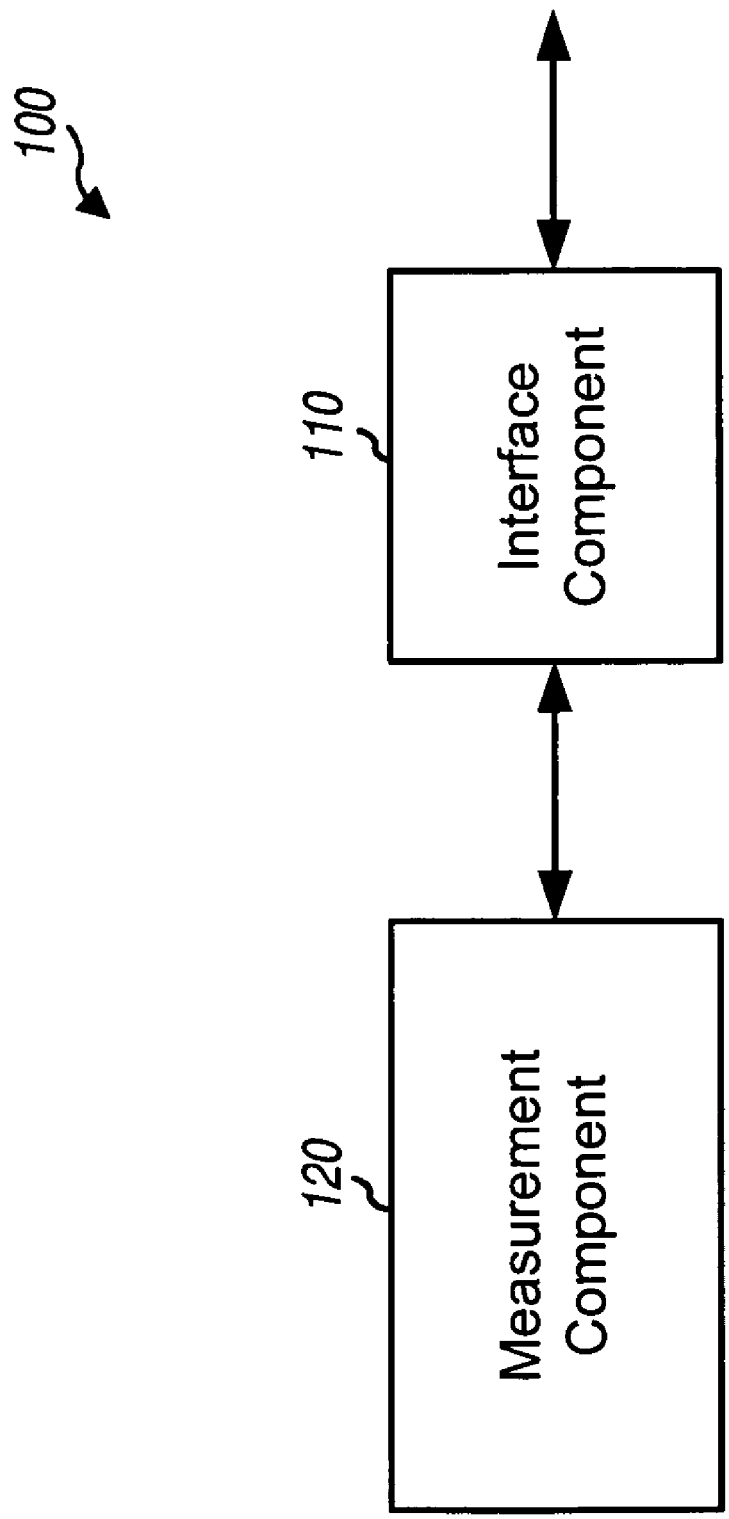
FIG. 1 shows an exemplary measurement system that determines performance metrics that facilitate wireless communication.

FIG. 1 shows a performance metric generating system 100 of a wireless communication system. The system 100 includes an interface component 110 and a measurement component 120. The interface component 110 is an interface that can be utilized to couple the measurement component 120 to a base station (not shown) or a mobile terminal (not shown). For example, the interface component 110 can be utilized to obtain information related to and/or characteristics of a forward link from a base station to a mobile terminal. The interface component 110 can convey the information/characteristics to the measurement component 120, which can utilize it to generate an associated performance metric. Such metric can be conveyed back to the base station through the interface component 110 and be utilized to facilitate communication with the mobile terminal.

In another embodiment, the interface component 110 can be utilized by a base station to obtain information related to and/or characteristics of a reverse link between the base station and a mobile terminal. In addition, the interface component 110 can convey the related information and/or characteristics to the measurement component 120, which can utilize such information to determine an associated performance metric that can be employed to improve communication with the mobile terminal. It is to be appreciated that the performance metric can be a signal-to-noise ratio (SNR) such as a capacity-based effective SNR or an approximation thereof. The base station can utilize such SNR to facilitate scheduling transmissions from the mobile terminal, transmitting power control commands to the mobile terminal, and determining the data rate supported by the mobile terminal, as described in detail below.

Figure 2:
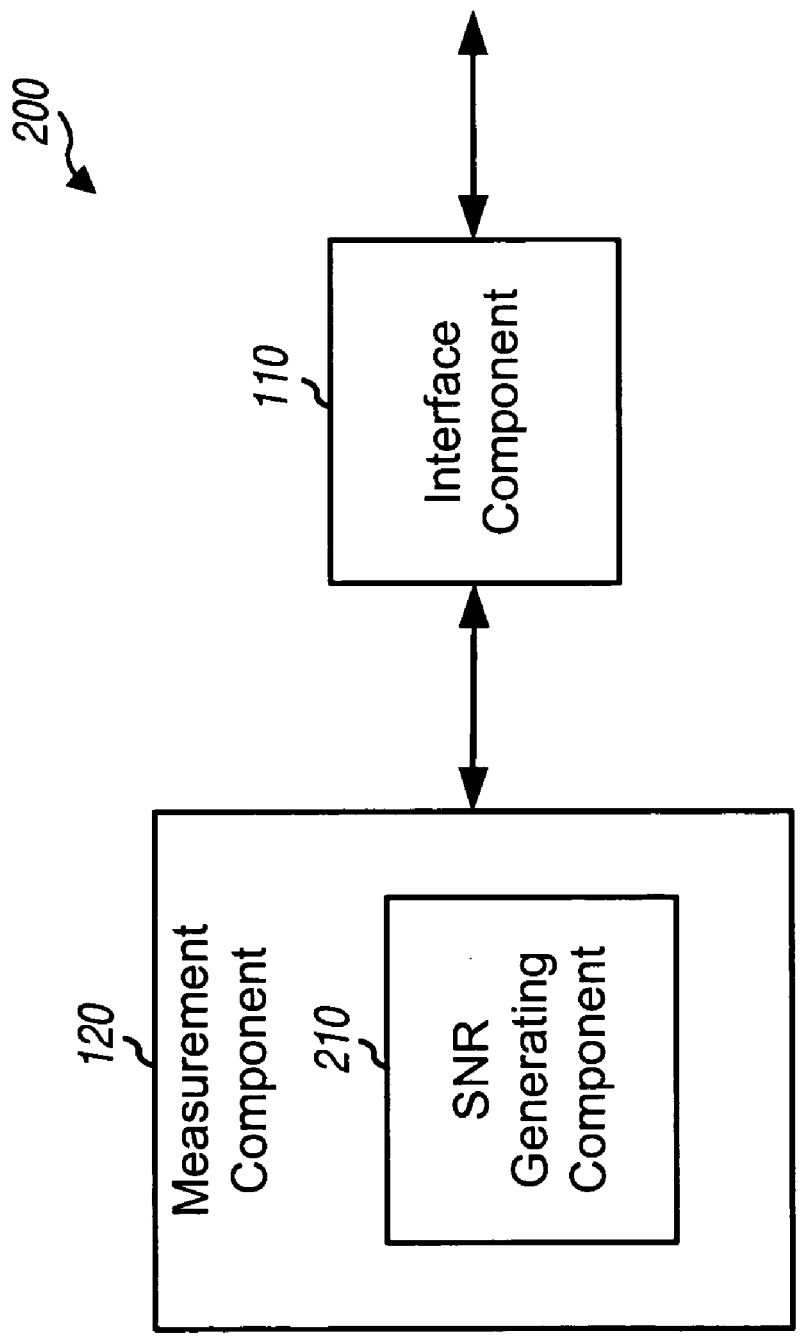
FIG. 2 shows an exemplary measurement system that determines an effective SNR performance metric.

FIG. 2 shows a performance metric generating system 200 that generates a SNR metric for a wireless communication system. The system 200 includes the interface component 110 and the measurement component 120 as described in connection with system 100 of FIG. 1 The system 200 further comprises a SNR generating component 210. As depicted, the SNR generating component 210 can be located within the measurement component 120; however, it is to be appreciated that this component can be a different component (separate therefrom) and/or the same component. Thus, this example is illustrative and not limitative. The SNR generating component 210 can utilize the information (e.g., channel variations, interference power variations, etc.) conveyed through the interface component 110 to determine an associated SNR. In one embodiment, the computed SNR is a capacity based effective SNR. For example, Equation 1 below or variants thereof can be utilized to compute an effective SNR for a set of modulation symbols spanning a codeword in the presence of channel and interference power variations.

Equation 1:

$$C(SNR_{eff}) = \frac{1}{N}\sum_{i=1}^{N} C(SNR_i);$$

wherein, $SNR_{eff} = C^{-1}(1/N \ldots)$, $SNR_i$ is the SNR of the ith modulation symbol and C( ) is the constrained capacity function corresponding to the modulation scheme.

The effective SNR can be useful for purposes of rate prediction, power control, etc. because it accurately predicts the performance of several coding schemes, including Turbo and Low Density Parity Check (LDPC) codes. For rate prediction, the received effective SNR can be compared to a set of thresholds corresponding to different packet formats to determine which packet can be decoded. An up command can be sent if the received effective SNR is less than a target effective SNR, and a down command can be sent otherwise.

It is to be appreciated that in various embodiments the effective SNR computation can include a backoff(which accounts for quantities such coding loss, etc.) as part of the capacity formula. For example, in Equation 1 above, $C(SNR_i)$ can be replaced by $C(SNR_i/backoff)$ to render Equation 2 below.

Equation 2:

$$C(SNR_{eff}) = \frac{1}{N}\sum_{i=1}^{N} C(SNR_i/backoff).$$

The effective SNR computation can also be suitably modified for use in different systems. For example, in an equalized single-carrier system, $SNR_i$ would be the SNR at the output of the equalizer. In a Rake based system, $SNR_i$ would be the SNR after Rake despreading. In general, the SNR of the modulation symbol typically is used at the input of the decoder, after the detection stage.

As noted above, a base station and/or a mobile terminal of the wireless communication system can employ the SNR generating component 210 to determine the capacity-based effective SNR. In one instance, the effective SNR can be the measure of a constrained effective SNR of the forward link channel using pilot/data symbols. Since different modulation schemes (e.g., QAM, PSK, etc.) can be utilized for forward link transmission and the mobile terminal may be unaware of which scheme is being utilized, the SNR generating component 210 can instead be utilized to compute an unconstrained effective SNR. When the base station utilizes the SNR generating component 210, the base station can measure the effective SNR from a transmission from a mobile terminal even when the mobile terminal sporadically transmits data.

The effective SNR computed by the SNR generating component 210 can be utilized by the base station to, among other things, facilitate scheduling transmissions from the mobile terminal, transmitting power control commands to the mobile terminal, and determine the data rate supported by the mobile terminal. In general, scheduling transmissions refers to making scheduling decisions to achieve multi-user diversity. For example, such scheduling can be associated with scheduling a mobile terminal transmission when an associated channel condition is favorable in order to maximize system capacity. Transmitting power control commands typically includes adjusting power to a mobile terminal to achieve a desired channel quality in terms of SNR and at a succeeding transmission. Determining a rate generally entails predicting a supporting rate, based on a combination of a modulation scheme and code rate for the mobile terminal. The mobile terminal itself can also predict the rate it can support and transmit it to the base station, using the measured effective SNR.

If the wireless communication system employs a reuse scheme in which different portions of a spectrum, or reuse sets, have different channel qualities, the mobile terminal can transmit Channel Quality Indicators (CQIs) for each of the different reuse sets, the last reuse set utilized, and/or the best reuse set. In addition, when interference power varies slower than channel power, an effective "C" measurement can be obtained at a fast rate and several effective "I" measurements can be obtained at a lower rate in order to conserve reverse link bandwidth. In general, an effective "C" measurement refers to computing an effective SNR as a function of a measured channel (C) value and a nominal interference (I) value. An effective "I" measurement refers to computing an effective SNR as a function of a measured interference (I) value and a nominal channel (C) value. An effective "C/Average I" measurement can be a better predictor of code performance, for example, when only the average interference is being estimated by a receiver. The effective "C/Average I" measurement generally refers to computing an effective SNR as a function of actual channel values for each modulation symbol and an average interference value. Equation 3 below illustrates a variation of the above equations that can be utilized to compute an effective "C/I" based SNR.

$$C(SNR_{eff}) = C^{-1}(1/N \operatorname{sum}(C(SNR_i))),$$  Equation 3 wherein SNR.sub.i is given by |h.sub.i|.sub.2/N.sub.0,i and h.sub.i is the channel seen by the ith modulation symbol, and N.sub.0,i is the interference power seen by the ith modulation symbol. An effective "C/Average I" based SNR can be computed as a function of Equation 4.

$$C(SNR_{\mathit{eff}})=C^{-1}(1-N\operatorname{sum}(C(SNR_i))), \quad \text{Equation 4}$$

wherein $SNR_i$ is given by $|h_i|^2/N_o$ and $N_0$ is the average interference power seen by all the symbols (e.g., $N_0=1/N\operatorname{sum}(N_{0,i})$).

Figure 3:
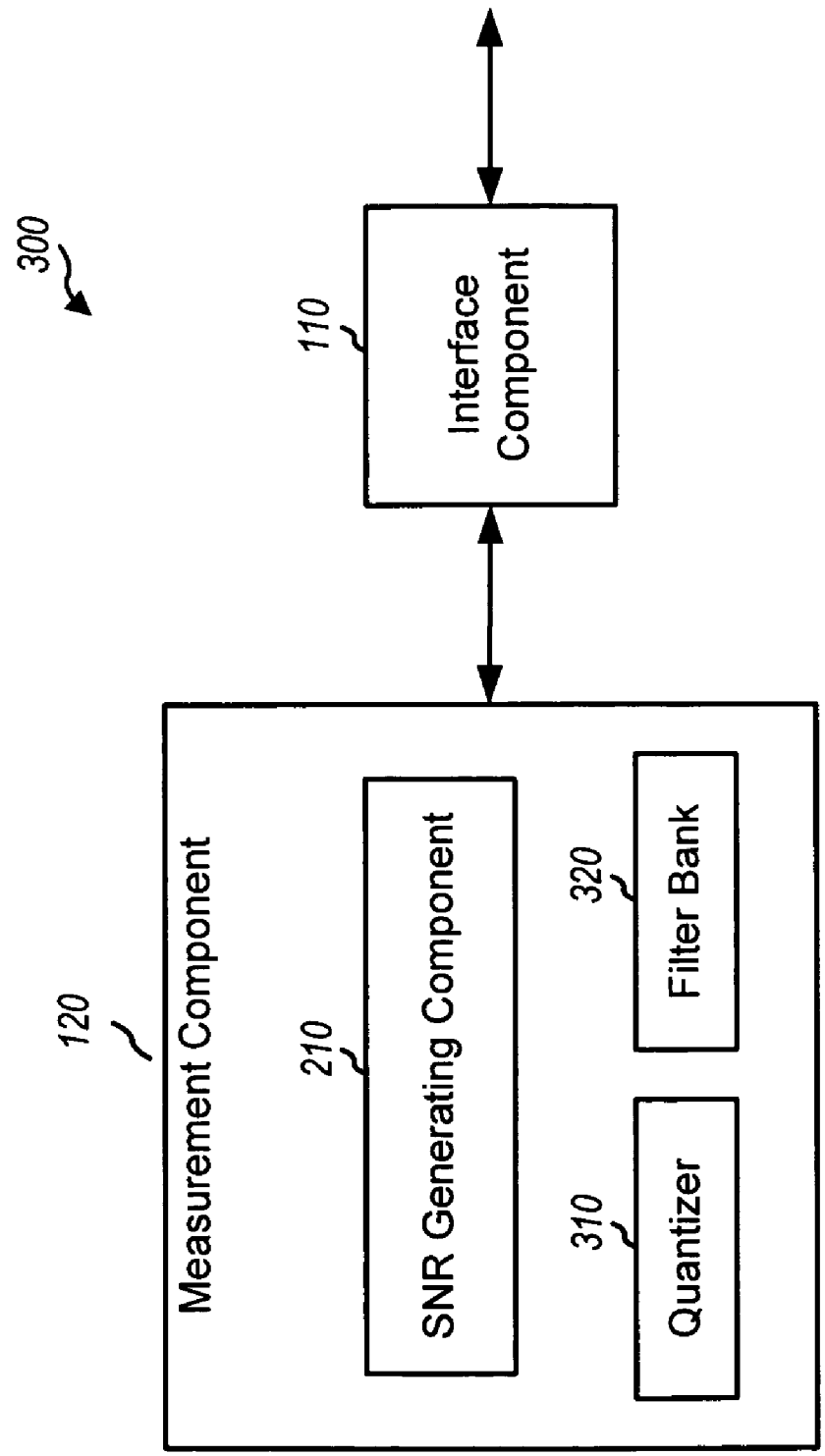
FIG. 3 shows an exemplary measurement system that employs a quantizer and/or various filters to determine an effective SNR.

FIG. 3 illustrates a performance metric generating system 300 that employs a quantizer and various filters to enhance performance within a wireless communication system. The system 300 includes the interface component 110, the measurement component 120 and the SNR generating component 210 that compute performance metrics, such as a capacity-based effective SNR (e.g., Equation 1 as described with FIG. 2), for example, from information related to and/or characteristics of a forward and/or a reverse link between a base station and a mobile terminal of the wireless communication system. The system 300 further includes a quantizer 310, which can be utilized to discretize the effective SNR. For example, the effective SNR can be quantized to a relatively small number of values. In addition, the quantization can be uniform, wherein symbols are equally spaced, or non-uniform, wherein symbols are not equally spaced. Such quantization can facilitate minimizing transmission overhead.

The system 300 also includes a filter bank 320 that stores various filters that can be utilized to facilitate determining the effective SNR. Such filters can be utilized by the mobile terminal and/or the base station. For example, when the mobile terminal determines the effective SNR, the mobile terminal can obtain a suitable filter from the filter bank 320 and utilize the filter when computing the effective SNR. Likewise, when the base station determines the effective SNR, the base station can obtain a suitable filter from the filter bank 320 and utilize the filter when computing the effective SNR. In addition, the base station can further filter an effective SNR obtained from the mobile terminal. The filter selected can be based on criteria such as purpose (e.g., scheduling, power control and data rate, as described herein), accuracy, and frequency (e.g., Doppler) at which the base station desires to respond to the instantaneous fade realization. In one embodiment, the filter utilized by the mobile terminal and/or base station is an averaging filter. A short filter can improve timeliness while a long filter can improve accuracy.

Upon determining the effective SNR, the base station can employ it to facilitate scheduling transmissions from the mobile terminal, transmitting power control commands to the mobile terminal, and determining the data rate supported by the mobile terminal, as described previously.

Figure 4:
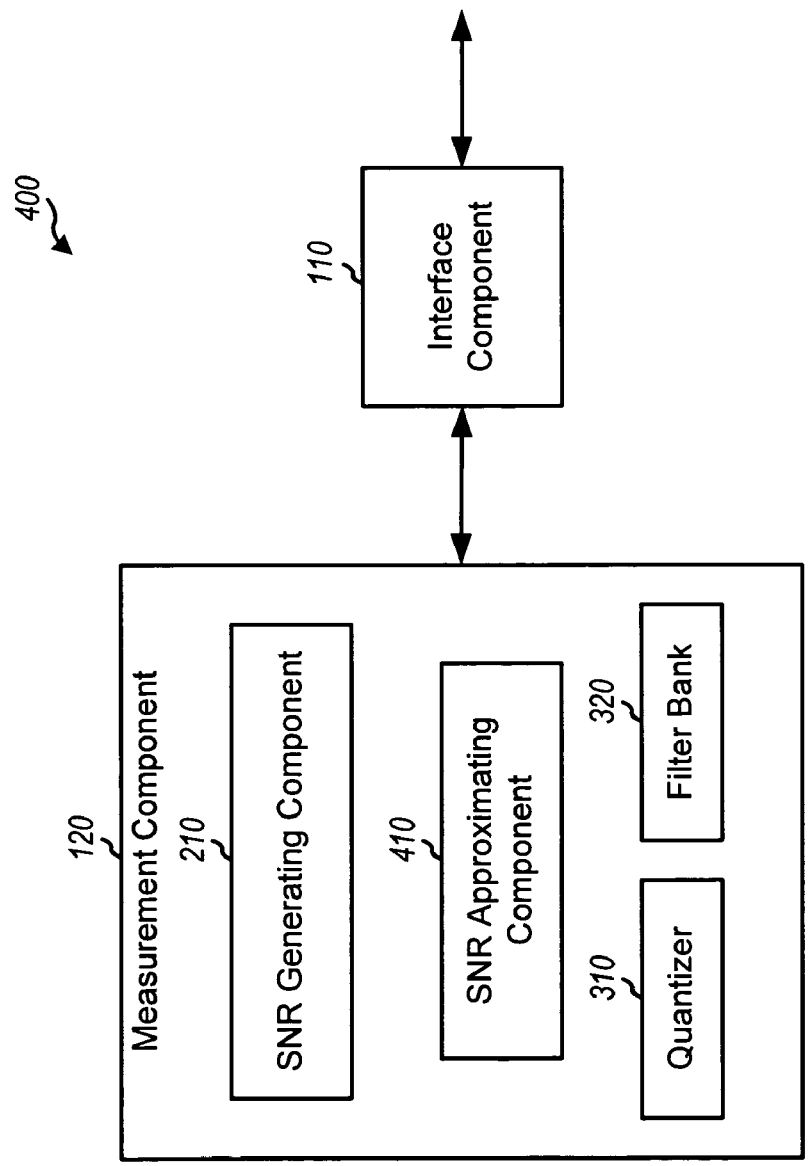
FIG. 4 shows an exemplary measurement system that approximates an effective SNR.

FIG. 4 illustrates a performance metric generating system 400 that approximates an effective SNR metric for wireless communication performance. The system 400 includes the interface component 110 and the measurement component 120. The measurement component 120 includes the SNR generating component 210, the quantizer 310, and the filter bank 320. The measurement component 120 further includes an SNR approximating component 410, which can additionally or alternatively be utilized to determine an effective SNR. As noted above, the SNR generating component 210 can be utilized to compute a capacity-based effective SNR and approximations thereof can be utilized. The SNR approximating component 410 can compute such approximations. One suitable approximation is the unconstrained Gaussian capacity (e.g., assuming Additive White Gaussian Noise (AWGN)). A further simplification would be to approximate the unconstrained capacity, or log(1+SNR) by log(SNR). Under this formulation, the capacity-based effective SNR becomes a geometric mean of individual SNRs. It is to be appreciated that this capacity-based effective SNR can be utilized with non-Gaussian channels by adapting the capacity function to the channel of interest.

Figure 5:
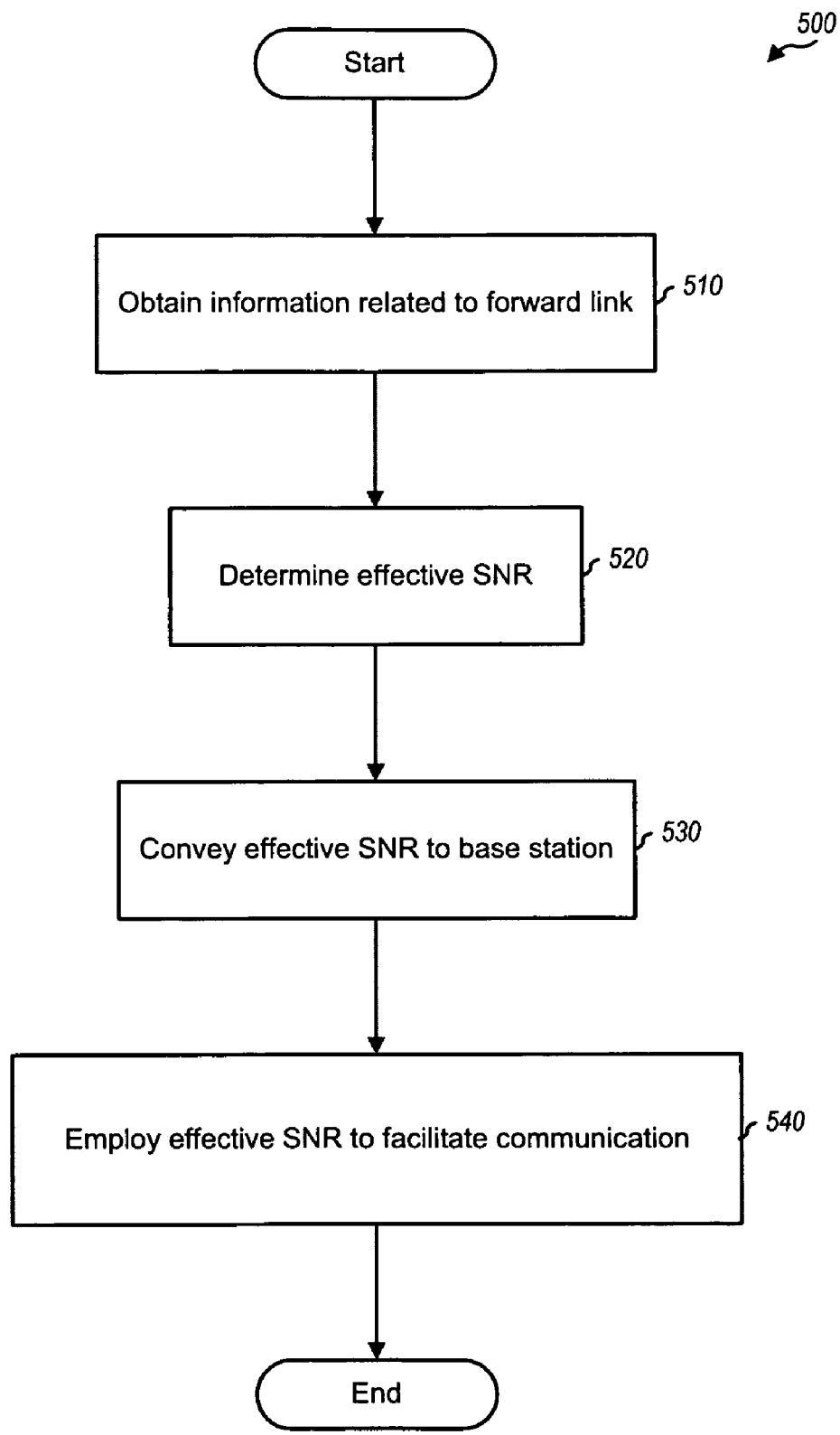
FIG. 5 shows an exemplary flow diagram for determining a performance metric at a mobile terminal and utilizing the metric at a base station to facilitate wireless communication.

FIG. 5 shows a flow diagram of a process 500 for determining a performance metric at a mobile terminal and utilizing the performance metric to facilitate wireless communication. As previously noted, (capacity-based) effective signal-to-noise ratio (SNR) performance metrics provides for good prediction of turbo code performance and, thus, can be utilized, as described herein, to improve wireless communication. For example, when channel and interference power varies over a duration of a single codeword, the error probability of that codeword can be accurately predicted by the capacity-based effective SNR of a set of modulation symbols spanning that codeword. In addition, the capacity-based effective SNR (e.g., constrained, unconstrained, approximated, etc.) can be utilized by a base station to facilitate scheduling transmissions from the mobile terminal, transmitting power control commands to the mobile terminal, and determining the data rate supported by the mobile terminal, for example.

In one embodiment, a mobile terminal of the wireless communication system can determine (e.g., measure, compute, etc.) the effective SNR and convey the SNR to the base station. In order to determine the SNR, the mobile terminal can obtain communications information through a forward link (block 510), for example, using pilot and/or data symbols. Such information can include channel and/or interference power variations and can be utilized to determine the effective SNR (block 520). It is to be appreciated that the effective SNR can be a constrained SNR. However, the embodiments described herein are not so limited. For example, since different modulation schemes can be utilized for forward link transmission and the mobile terminal may be unaware of which scheme is being utilized, the mobile terminal can measure an unconstrained effective SNR. In addition, approximations can be utilized if necessary or desired. One suitable approximation is an unconstrained Gaussian capacity function (e.g., assuming AWGN). A further simplification would be to approximate the unconstrained capacity, or log (1+SNR) by log(SNR), wherein the capacity-based effective SNR becomes the geometric mean of individual SNRs. It is to be appreciated that this capacity-based effective SNR can also be utilized with non-Gaussian channels.

When interference power varies slower than channel power, an effective "C" measurement can be obtained at a fast rate and several effective "I" measurements can be obtained at a lower rate in order to conserve reverse link bandwidth. An effective "C" measurement is an effective SNR computation using a measured channel (C) value and a nominal interference (I) value, and an effective "I" measurement is an effective SNR computation using a measured interference (I) value and a nominal channel (C) value. An effective "C/Average I" measurement can be utilized when it is determined that an average interference power over the modulation symbols is desired instead of an interference power measurement for individual modulation symbols. The effective "C/Average I" measurement is an effective SNR computation utilizing actual channel values for each modulation symbol and the average interference value. If the wireless communication system utilizes a reuse scheme in which different portions of a spectrum have different channel qualities, the mobile terminal can transmit Channel Quality Control Indicators (CQIs) for each of the different reuse sets, the last reuse set utilized, and/or the best reuse set.

The mobile terminal, upon determining the effective SNR, can convey it to a base station (block 530). It is to be appreciated that prior to conveyance, the effective SNR can be quantized and/or various filters can be employed to facilitate determining the effective SNR. For example, the effective SNR can be quantized to a predetermined set of values. This set of values can be uniform, wherein symbols are equally spaced, or non-uniform, wherein symbols are not equally spaced. Such quantization can facilitate minimizing transmission overhead from mobile terminal to base station. Filters can be utilized while determining the effective SNR. One suitable filter is an averaging filter that is utilized to compute an average effective SNR. A short filter can improve timeliness while a long filter can improve accuracy.

The base station can utilize the effective SNR to facilitate wireless communication (block 540). By way of example, the effective SNR can be utilized to schedule transmissions from the mobile terminal, transmit power control commands to the mobile terminal, and determine the data rate supported by the mobile terminal, for example. Scheduling transmissions includes rendering scheduling decisions so as to achieve multi-user diversity, which can be considered a technique to schedule a given user when an associated channel condition is favorable in order to maximize system capacity. Transmitting power control commands can include adjusting power to a mobile terminal in order to achieve a desired channel quality in terms of SNR and at a succeeding transmission. Determining a supporting rate can include predicting rate in order to determine a combination of modulation scheme and code rate for the mobile terminal.

Figure 6:
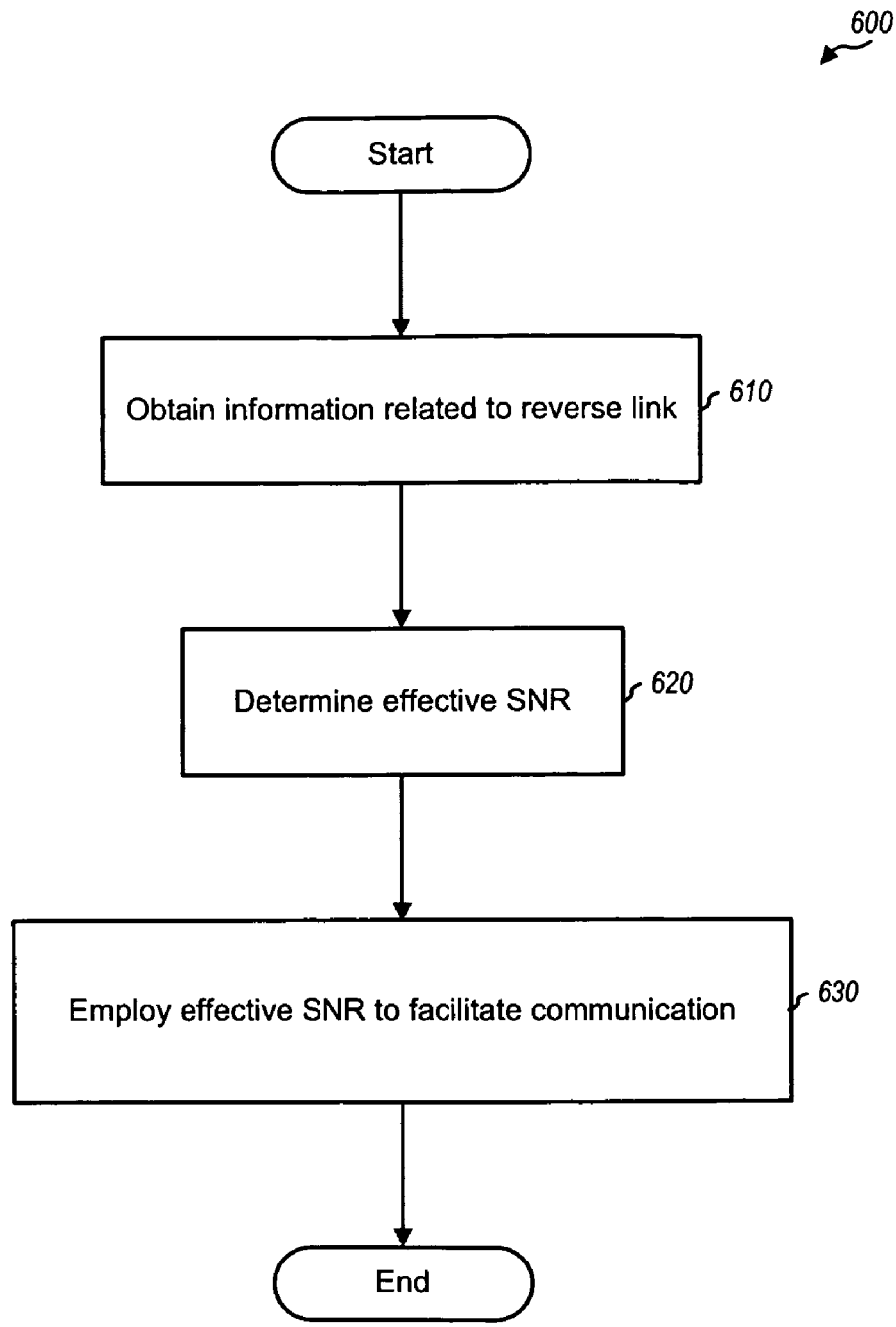
FIG. 6 shows an exemplary flow diagram for determining and utilizing a performance metric at a base terminal to facilitate wireless communication.

FIG. 6 shows a flow diagram of a process 600 for determining and utilizing a performance metric such as an effective SNR at a base station to facilitate wireless communication. In order to determine the SNR, the base station can obtain communications information through a reverse link with a mobile terminal (block 610). Such information can include, but is not limited to, channel variations and interference power variations, for example.

The base station can utilize this information to determine the effective SNR for a transmission from the mobile terminal (block 620). It is to be appreciated that such determination can be performed even when the mobile terminal sporadically transmits data. Similar to a mobile terminal the base station can measure a constrained, unconstrained and/or approximated effective SNR. One suitable approximation is an unconstrained Gaussian capacity function (e.g., assuming AWGN), and a further simplification would be to approximate the unconstrained capacity. Moreover, an effective "C," an effective "I," and/or an effective "C/Average I," as described herein, can be utilized in various embodiments. Similar to the mobile terminal, the base station can employ various filters in connection with determining the effective SNR. Such filters can be chosen based on a particular purpose (e.g., scheduling, power control and data rate, as described below), a desired SNR accuracy, and a frequency at which the base station desires to respond to the instantaneous fade realization.

The base station can utilize the effective SNR to facilitate wireless communication (block 630). As previously noted, an effective signal-to-noise ratio (SNR) provides for good prediction of turbo code performance and can improve wireless communication. In one embodiment, the effective SNR can be utilized to schedule transmissions from the mobile terminal, transmit power control commands to the mobile terminal, and determine the data rate supported by the mobile terminal, for example. Scheduling transmissions includes rendering scheduling decisions so as to achieve multi-user diversity, which can be considered a technique to schedule a given user when an associated channel condition is favorable in order to maximize system capacity. In another embodiment, the effective SNR can be utilized to facilitate power control through transmitting power control commands that adjust power to the mobile terminal to achieve a desired channel quality for a succeeding transmission. In another embodiment, the effective SNR can be utilized to predict a supporting rate for a mobile terminal based on a modulation scheme and/or code rate.

Figure 7:
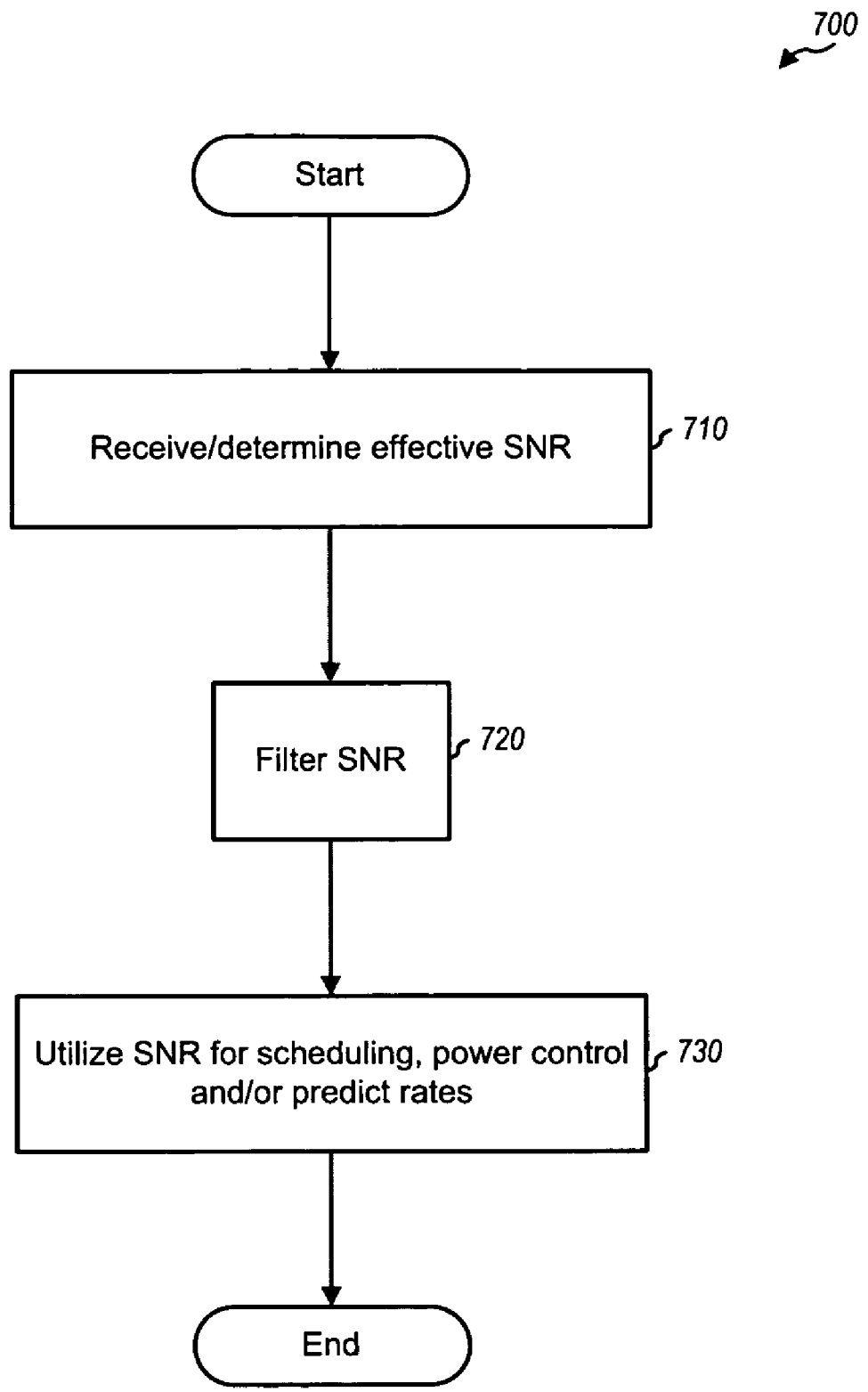
FIG. 7 shows an exemplary flow diagram for utilizing a performance metric at a base terminal to facilitate wireless communication.

FIG. 7 shows a flow diagram of a process 700 for utilizing a performance metric at a base station to facilitate wireless communication. As described in connection with FIG. 5, a mobile terminal can determine an effective SNR based on information obtained from a forward link with a base station. This effective SNR can be quantized and/or filtered and conveyed to the base station (Block 710). Upon receiving the effective SNR, the base station can further filter the effective SNR (Block 720). As noted in connection with FIG. 6, the filter(s) utilized can be selected based on a particular purpose, such as scheduling, power control and data rate, for example, a desired SNR accuracy, and a frequency at which the base station desires to respond to the instantaneous fade realization. In one embodiment, an averaging filter such as a short filter can be selected and utilized to compute an average effective SNR that can improve timeliness. In another example, a long filter can be utilized to improve accuracy. The base station can utilize the effective SNR to improve wireless communication (block 730), for example, to facilitate scheduling, power control and/or predicting supporting rates, as described herein.

Figure 8:
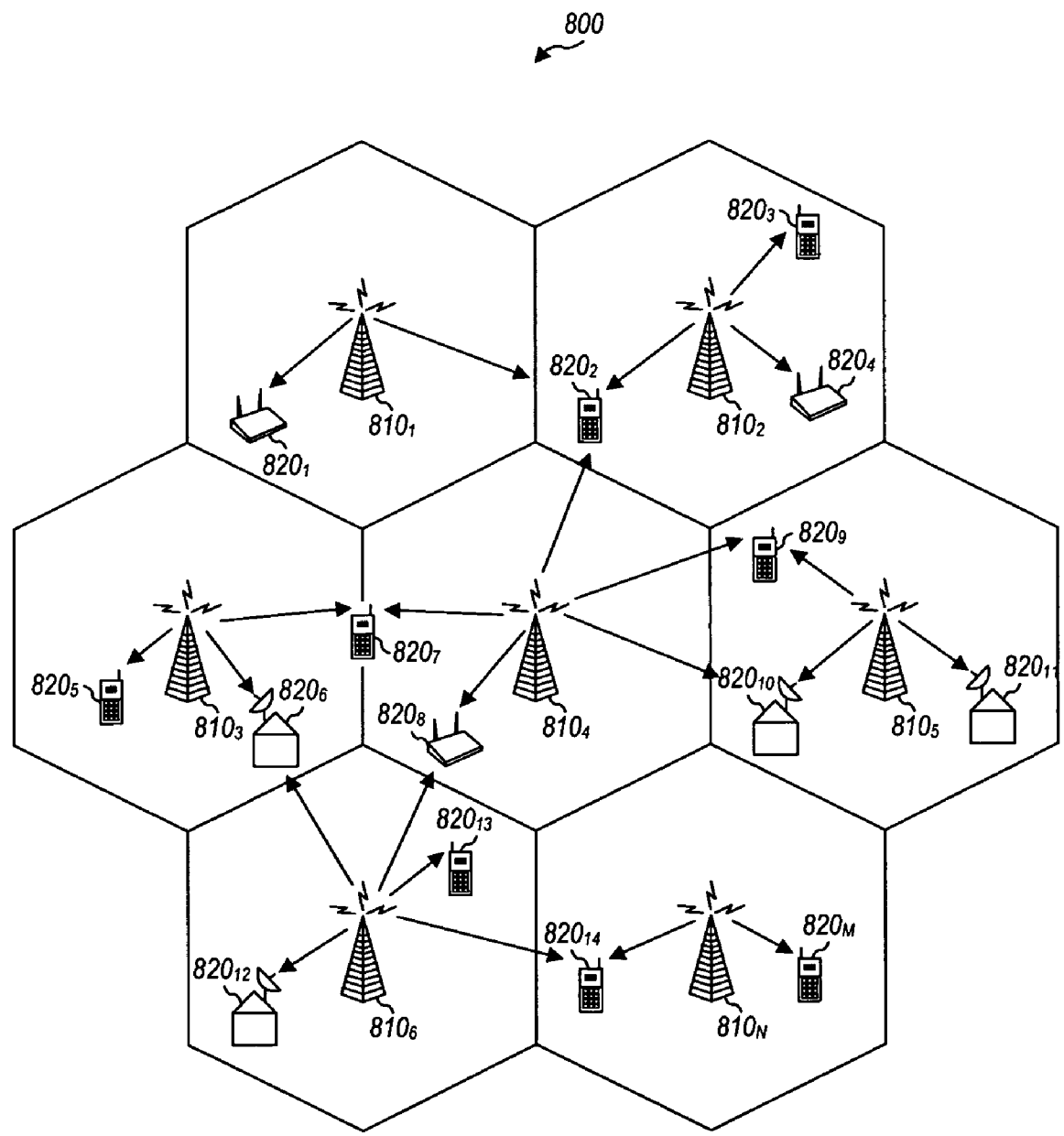
FIG. 8 shows an exemplary wireless communication system with a plurality of base stations and mobile terminals.

FIG. 8 shows an exemplary wireless communication system 800. The system 800 includes N base stations $810_1$, $810_2$, $810_3$, $810_4$, $810_5$, $810_6$, $810_N$, wherein N is an integer equal to or greater than one, distributed therein. It is to be appreciated that the N base stations $810_1$, $810_2$, $810_3$, $810_4$, $810_5$, $810_6$, $810_N$ can be collectively referred to as base stations 810. A typical base station generally is a fixed station and can be referred to as an access point, a transmitter, and the like. Neighboring base stations may broadcast substantially similar or different content. The system 800 further includes M wireless devices $820_1$, $820_2$, $820_3$, $820_4$, $820_5$, $820_6$, $820_7$, $820_8$, $820_9$, $820_{10}$, $820_{11}$, $820_{12}$, $820_{13}$, $820_{14}$, $820_M$, wherein M is an integer equal to or greater than one, distributed across (e.g., within one or more) coverage areas of the base stations 810. It is to be appreciated that the M wireless devices $820_1$, $820_2$, $820_3$, $820_4$, $820_5$, $820_6$, $820_7$, $820_8$, $820_9$, $820_{10}$, $820_{11}$, $820_{12}$, $820_{13}$, $820_{14}$, $820_M$, can be collectively referred to as wireless devices 820.

As depicted, a wireless device can be fixed or mobile and can be referred to as a mobile terminal, a user terminal, a mobile station, user equipment, and the like. In addition, a wireless device can be a portable unit such as a cellular phone, a handheld device, a wireless module, a personal digital assistant (PDA), and the like. In general, respective base stations 810 can concurrently and/or serially broadcast one or more data streams to any or all of the wireless devices within an associated coverage area. Such data streams can be for multimedia content such as video, audio, tele-text, data, video/audio clips, etc. For example, a single multimedia (e.g., television) program can be sent in three separate data streams for video, audio, and data. In another example, a single multimedia program can have multiple audio data streams, for example, respective streams for different languages. Individual data streams can be sent on a similar or separate physical layer channel.

Figure 9:
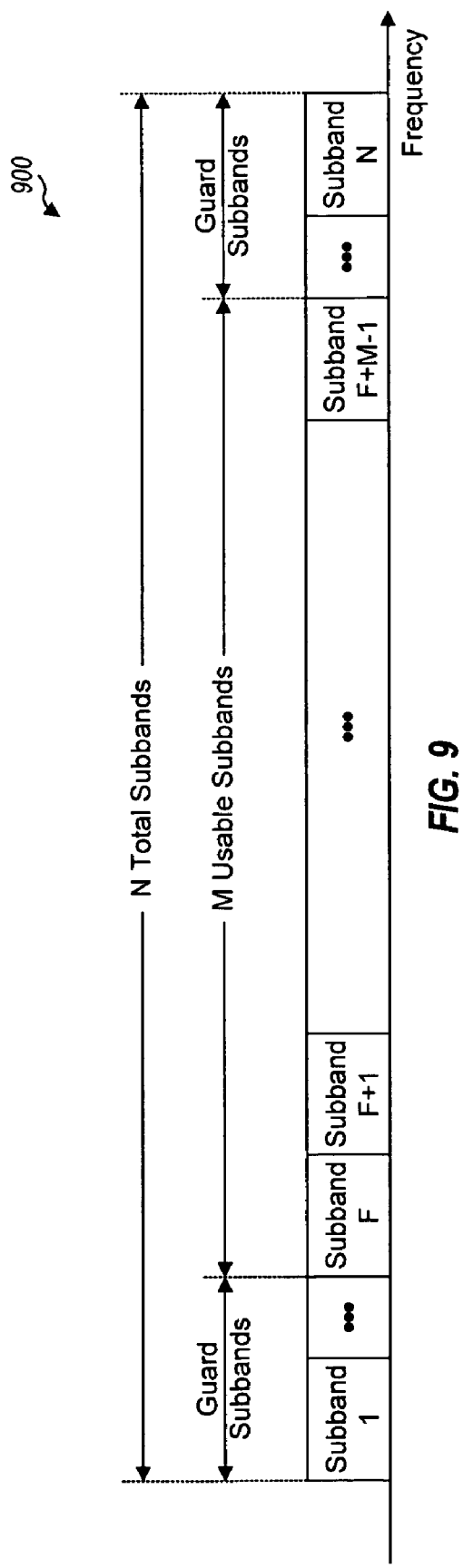
FIG. 9 shows an exemplary subband structure.

FIG. 9 shows an exemplary subband structure 900 that can be utilized for an OFDM system. In this example, the OFDM system has an overall system bandwidth of BW MHz, which is partitioned into N orthogonal subbands using OFDM. Each subband has a bandwidth of BW/N MHz. In a spectrally shaped OFDM system, only M of the N total subbands are used for data/pilot transmission, wherein M<N. The remaining N−M subbands are not used for data/pilot transmission and serve as guard subbands to allow the OFDM system to meet spectral mask requirements. The M usable subbands include subbands F through F+M−1 and are typically centered among the N total subbands. The N subbands of the OFDM system may experience different channel conditions (e.g., different fading and multipath effects) and may be associated with different complex channel gains. An accurate estimate of the channel response is normally needed to process (e.g., demodulate and decode) data at a receiver.

The wireless channel in the OFDM system may be characterized by either a time-domain channel impulse response or a corresponding frequency-domain channel frequency response. As used herein, and which is consistent with conventional terminology, a "channel impulse response" is a time-domain response of the channel, and a "channel frequency response" is a frequency-domain response of the channel. The channel frequency response is the discrete Fourier transform (DFT) of the channel impulse response.

The impulse response of the wireless channel can be characterized by L taps, where L is typically much less than the number of total subbands (L<N). That is, if an impulse is applied to the wireless channel by the transmitter, then L time-domain samples (at the sample rate of BW MHz) would be sufficient to characterize the response of the wireless channel based on this impulse stimulus. The number of taps (L) for the channel impulse response is dependent on the delay spread of the system, which is the time difference between the earliest and latest arriving signal instances of sufficient energy at the receiver. A longer delay spread corresponds to a larger value for L, and vice versa. The vector utilized can include one non-zero entry for each tap of the channel impulse response. For a delay spread of L, the first L entries of the vector may contain non-zero values and the N−L remaining entries are all zeros.

Figure 10:
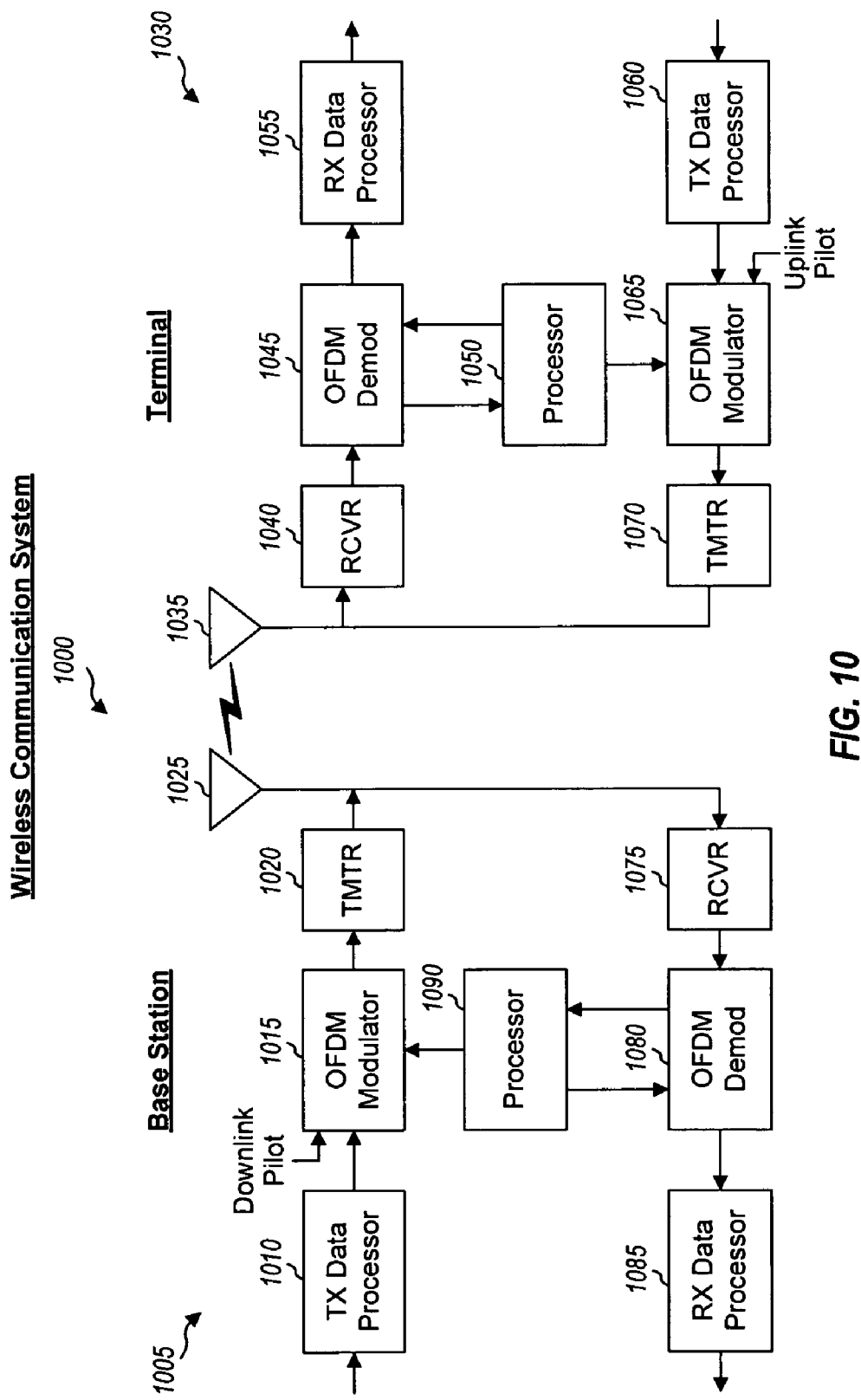
FIG. 10 shows an exemplary wireless communication system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-4) and/or methods (FIGS. 5-7) described herein to facilitate wireless communication therebetween.

Referring now to FIG. 10, on a downlink, at access point 1005, a transmit (TX) data processor 1010 receives, formats, codes, interleaves, and modulates (or symbol maps) traffic data and provides modulation symbols ("data symbols"). An OFDM modulator 1015 receives and processes the data symbols and pilot symbols and provides a stream of OFDM symbols. An OFDM modulator 1015 multiplexes data and pilot symbols on the proper subbands, provides a signal value of zero for each unused subband, and obtains a set of N transmit symbols for the N subbands for each OFDM symbol period. Each transmit symbol may be a data symbol, a pilot symbol, or a signal value of zero. The pilot symbols may be sent continuously in each OFDM symbol period. Alternatively, the pilot symbols may be time division multiplexed (TDM), frequency division multiplexed (FDM), or code division multiplexed (CDM). OFDM modulator 1015 can transform each set of N transmit symbols to the time domain using an N-point IFFT (N-point inverse fast Fourier Transform) to obtain a "transformed" symbol that contains N time-domain chips. OFDM modulator 1015 typically repeats a portion of each transformed symbol to obtain a corresponding OFDM symbol. The repeated portion is known as a cyclic prefix and is used to combat delay spread in the wireless channel.

A transmitter unit (TMTR) 1020 receives and converts the stream of OFDM symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. An OFDM demodulator 1045 removes the cyclic prefix appended to each OFDM symbol, transforms each received transformed symbol to the frequency domain using an N-point FFT, obtains N received symbols for the N subbands for each OFDM symbol period, and provides received pilot symbols to a processor 1050 for channel estimation. OFDM demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by OFDM demodulator 1045 and RX data processor 1055 is complementary to the processing by OFDM modulator 1015 and TX data processor 1010, respectively, at access point 1000.

On the uplink, a TX data processor 1060 processes traffic data and provides data symbols. An OFDM modulator 1065 receives and multiplexes the data symbols with pilot symbols, performs OFDM modulation, and provides a stream of OFDM symbols. The pilot symbols may be transmitted on subbands that have been assigned to terminal 1030 for pilot transmission, where the number of pilot subbands for the uplink may be the same or different from the number of pilot subbands for the downlink. A transmitter unit 1070 then receives and processes the stream of OFDM symbols to generate an uplink signal, which is transmitted by the antenna 1035 to the access point 1010.

At access point 1010, the uplink signal from terminal 1030 is received by the antenna 1025 and processed by a receiver unit 1075 to obtain samples. An OFDM demodulator 1080 then processes the samples and provides received pilot symbols and data symbol estimates for the uplink. An RX data processor 1085 processes the data symbol estimates to recover the traffic data transmitted by terminal 1035. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1010 and terminal 1035, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access OFDM system (e.g., an orthogonal frequency division multiple-access (OFDMA) system), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

Figure 11:
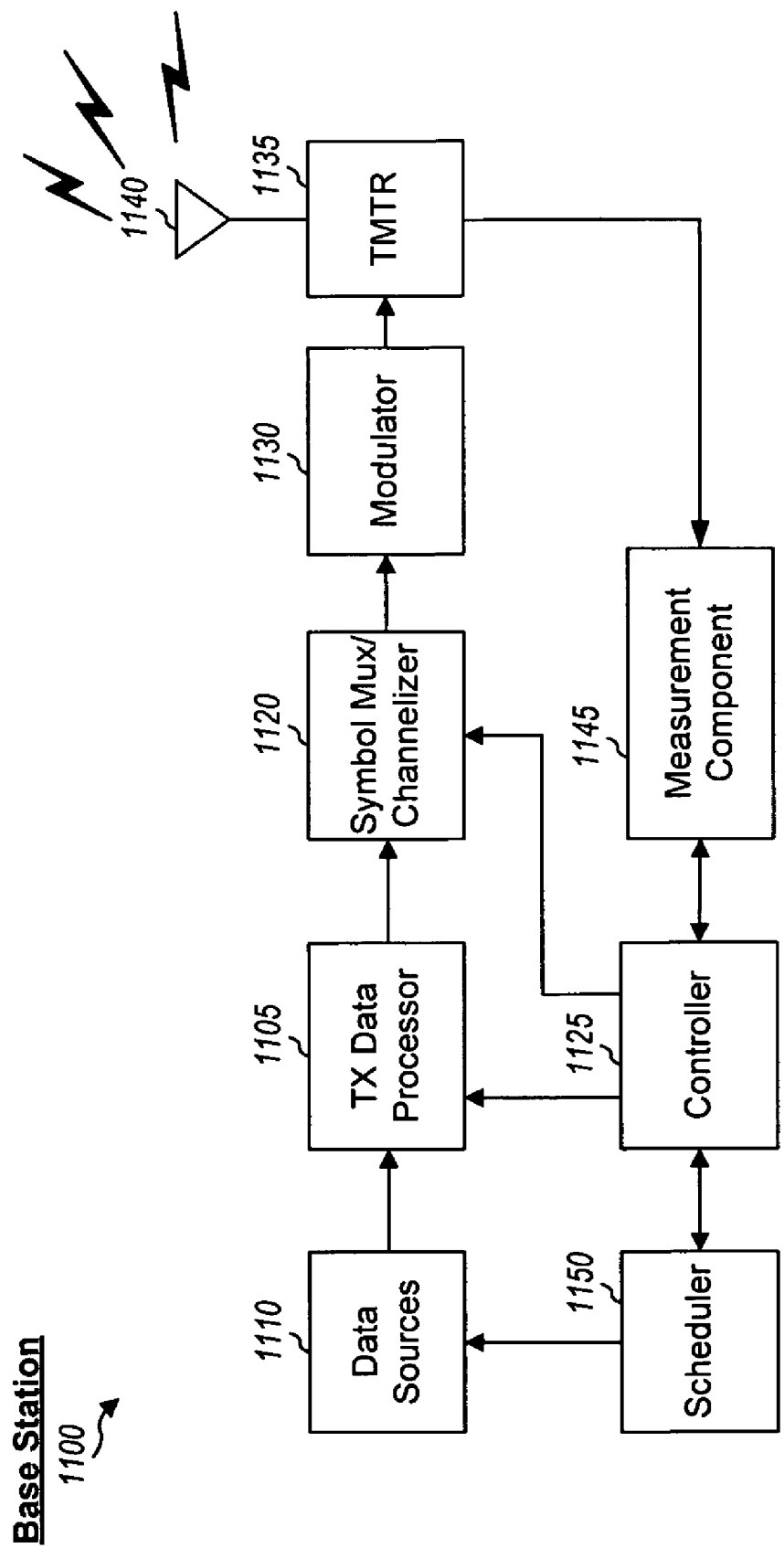
FIG. 11 shows an exemplary base station.

FIG. 11 shows a block diagram of an exemplary base station 1100. At the base station 1100, a transmit (TX) data processor 1105 receives one or more data streams from one or more data sources 1110, e.g., multiple data sources for different services. The TX data processor 1105 processes respective data stream in accordance with a mode selected for that stream to generate a corresponding data symbol stream and provides the data symbol streams to a symbol multiplexer (Mux)/channelizer 1120. The TX data processor 1105 also receives overhead data from a controller 1125, processes the overhead data in accordance with the mode used for overhead data, and provides an overhead symbol stream to the channelizer 1120. In general, an overhead symbol is a modulation symbol for overhead data.

The channelizer 1120 multiplexes the data symbols in the data symbol streams onto their assigned transmission units, and provides pilot symbols on pilot subbands and guard symbols on guard subbands. The channelizer 1120 further multiplexes pilot symbols and overhead symbols in the pilot and overhead section preceding associated frames. The channelizer 1120 provides a composite symbol stream that carries data, overhead, pilot, and guard symbols on the proper subbands and symbol periods. A modulator 1130 modulates the composite symbol stream and provides a stream of symbols to a transmitter unit (TMTR) 1135, which conditions (e.g., converts to analog, filters, amplifies, and frequency upconverts) the symbol stream and generates a modulated signal that is transmitted from an antenna 1140.

The system 1100 further comprises a measurement component 1145. The measurement component 1145 can be substantially similar to the measurement components described in connection with FIGS. 1-4 and/or employ the methods of described in connection with FIGS. 5-7. Thus the measurement component 1145 can obtain information related to communications from the TMTR 1135, wherein such information can include channel variations and interference power variations. Received information can be utilized to determine a performance metric such as a capacity-based effective SNR.

It is to be appreciated that the SNR can be determined even when a transmitting mobile terminal (not shown) sporadically transmits data to the base station 1100. In addition or alternatively, the effective SNR can be computed by a mobile terminal and conveyed to the base station 1100.

The computed SNR can be a capacity-based effective SNR. Such definition can be based on a constrained capacity function corresponding to a particular modulation scheme or an approximation to the constrained capacity function, such as an unconstrained Gaussian capacity function. A further simplification would be to approximate the unconstrained capacity. The measurement component 1145 can employ various filters (e.g., averaging) when determining the effective SNR and/or for further processing of an effective SNR received from a mobile terminal. Such filters can be chosen for particular purposes, such as scheduling, power control and predicting data rates, for example, achieving a desired SNR accuracy, and a modulating at a desired frequency.

As briefly note above, the effective SNR can be utilized to schedule transmissions from a mobile terminal, transmit power control commands to the mobile terminal, and determine the data rate supported by the mobile terminal, for example. Such scheduling can be performed by a scheduler 1150, which can make scheduling decisions to achieve multi-user diversity by scheduling a given user when an associated channel condition is favorable in order to maximize system capacity. The controller 1125 can utilize the effective SNR to transmit power control commands to adjust power to a mobile terminal to achieve a desired channel quality at a succeeding transmission. In addition, the controller 1125 can utilize the effective SNR to determine a supporting rate for a mobile terminal based on a modulation scheme and/or a code rate.

Figure 12:
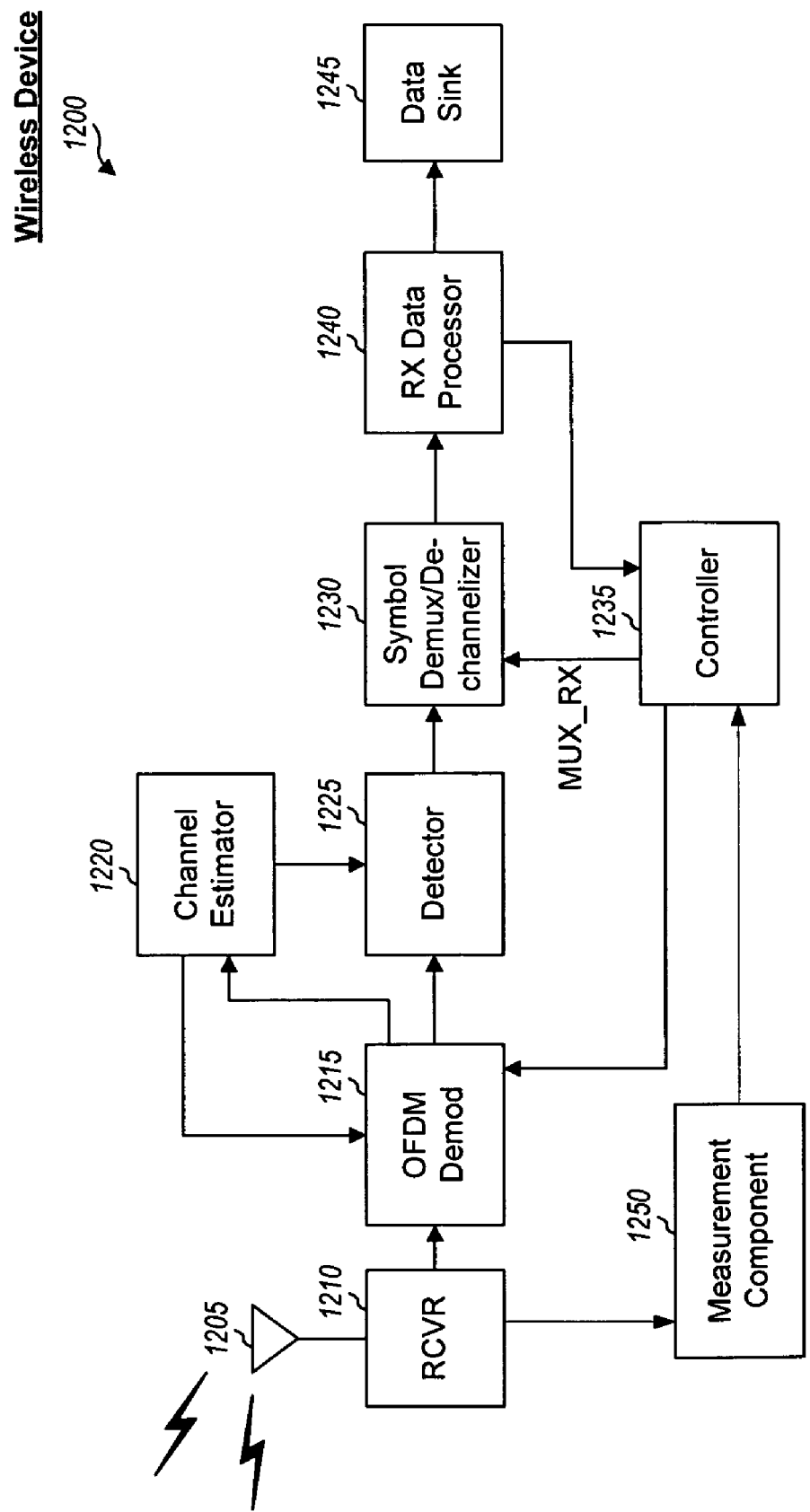
FIG. 12 shows an exemplary mobile terminal.

FIG. 12 shows a block diagram of a wireless device 1200. At the wireless device 1200, an antenna 1205 receives a modulated signal transmitted by a base station (not shown) and provides a received signal to a receiver unit (RCVR) 1210. The receiver unit 1210 conditions, digitizes, and/or processes the received signal and provides a sample stream to a demodulator 1215. The demodulator 1215 performs demodulation on the sample stream and provides received pilot symbols to a channel estimator 1220 and received data symbols and received overhead symbols to a detector 1225. The channel estimator 1220 derives a channel response estimate for the radio link between the base station and the wireless device 1200, based on the received pilot symbols. The detector 1225 performs detection (e.g., equalization or matched filtering) on the received data and overhead symbols with the channel response estimate. In addition, the detector 1225 provides to a symbol demultiplexer (Demux)/dechannelizer 1230 "detected" data and overhead symbols, which are estimates of the transmitted data and overhead symbols, respectively. The detected data/overhead symbols may be represented by log-likelihood ratios (LLRs) for the code bits used to form the data/overhead symbols, or by other representations. Channel estimator 1220 can also provide timing and frequency information to the demodulator 1225.

A controller 1235 obtains an indication of (e.g., user selection for) one or more specific data streams to be recovered and determines resource allocation and assignment for each selected stream. If the wireless device 1200 is acquiring the signal for the first time (e.g., initial acquisition), then the signaling information is obtained from the overhead symbols decoded by a receive (RX) data processor 1240. If the wireless device 1200 is successfully receiving data blocks in frames, then the signaling information may be obtained through the embedded overhead signaling that is part of at least one data block sent in a super-frame. In general, a super-frame includes one or more frames and is utilized to convey one or more data streams. For each data stream, respective data blocks are processed (e.g., outer encoded) to generate corresponding code blocks. Each code block is partitioned into multiple subblocks, and each subblock is further processed (e.g., inner encoded and modulated) to generate a corresponding subblock of modulation symbols. Each code block is transmitted in one super-frame, and the multiple subblocks for the code block are transmitted in the multiple frames of the super-frame, one subblock per frame.

This embedded overhead signaling indicates the allocation and assignment of the corresponding data stream in the next frame. The controller 1235 provides a MUX_RX control to the dechannelizer 1230, and the dechannelizer 1230 performs demultiplexing of the detected data or overhead symbols for each symbol period based on the MUX_RX control and provides one or more detected data symbol streams or a detected overhead symbol stream, respectively, to RX data processor 1240. In the case of the overhead symbols, RX data processor 1240 processes the detected overhead symbol stream in accordance with the mode used for overhead signaling and provides the decoded overhead signaling to the controller 1235. For the data symbol stream(s), RX data processor 1240 processes each detected data symbol stream of interest, in accordance with the mode used for that stream, and provides a corresponding decoded data stream to a data sink 1245.

The system 1200 further comprises a measurement component 1250. The measurement component 1250 can be substantially similar to the measurement components described in connection with FIGS. 1-4 and/or employ the methods of described in connection with FIGS. 5-7. As such, the measurement component 1250 can obtain communication related information (e.g., channel and interference power variations) from the RCVR 1210 and utilize this information to determine a performance metric such as a capacity-based effective SNR. The computed SNR can be a constrained or unconstrained capacity-based effective SNR and approximations and simplifications thereof. In order to minimize transmission overhead, the measurement component 1250 can quantize the effective SNR through a uniform or non-uniform technique. In addition, the measurement component 1250 can employ various filters to further process the effective SNR, as described herein. The measurement component 1250 can then transmit the effect SNR to a base station (not shown) through the RCVR 1210 and the antenna 1205. As described above, the base station can utilize the effective SNR to schedule transmissions from the mobile terminal, transmit power control commands to the mobile terminal, and determine the data rate supported by the mobile terminal, for example.

The descriptions of the disclosed embodiments are provided to enable any person skilled in the art to make or use the systems and methods described herein. Various modifications to these embodiments will be readily apparent to those skilled in the art, and the generic principles defined herein may be applied to other embodiments without departing from the spirit or scope. Thus, the systems and methods are not intended to be limited to the embodiments shown herein but is to be accorded the widest scope consistent with the principles and novel features disclosed herein.

What is claimed is:

1. A method that facilitates wireless communication, comprising:

receiving information associated with a forward link at a mobile terminal, the information including channel related information and power related information;

determining a capacity based effective signal-to-noise ratio (SNR) from the received information;

conveying the capacity based effective SNR to a base station;

comparing the capacity based effective SNR to a target effective SNR, wherein an up command is sent if the capacity based effective SNR is less than the target effective SNR and a down command is sent otherwise;

utilizing the capacity based effective SNR to facilitate wireless communication; and computing the capacity based effective SNR as follows:

$$C(SNR_{\mathit{eff}}) = \frac{1}{N}\sum_{i=1}^{N} C(SNR_i),$$

wherein $SNR_{\mathit{eff}} = C^{-1}(1/N \ldots),$ $SNR_i$ is the SNR of the ith modulation symbol;

C( ) is the constrained capacity function corresponding to the modulation scheme;

N is the total number of modulated symbols;

$N_{0,i}$ is the interference power seen by the ith modulation symbol;

$N_0$ is the average interference power seen by all the symbols; and $N_0 = (1/N) \mathrm{sum}(N_{0,i})$.

2. A method that facilitates wireless communication, comprising:

receiving information associated with a forward link at a mobile terminal, the information including channel related information and power related information;

determining a capacity based effective signal-to-noise ratio (SNR) from the received information;

conveying the capacity based effective SNR to a base station;

comparing the capacity based effective SNR to a target effective SNR, wherein an up command is sent if the capacity based effective SNR is less than the target effective SNR and a down command is sent otherwise;

utilizing the capacity based effective SNR to facilitate wireless communication; and computing the capacity based effective SNR as follows:

$$C(SNR_{\mathit{eff}}) = \frac{1}{N}\sum_{i=1}^{N} C(SNR_i / \mathit{backoff}),$$

wherein $SNR_{\mathit{eff}} = C^{-1}(1/N \ldots),$ $SNR_i$ is the SNR of the ith modulation symbol;

backoff accounts for coding loss; AND

C( ) is the constrained capacity function corresponding to the modulation scheme;

N is the total number of modulated symbols;

$N_{0,i}$ is the interference power seen by the ith modulation symbol;

$N_0$ is the average interference power seen by all the symbols; and $N_0 = (1/N) \mathrm{sum}(N_{0,i})$.

3. A system that facilitates wireless communication, comprising:

a first component that determines a capacity based effective signal-to-noise ratio (SNR); a filter bank with a plurality of filters that are utilized to facilitate determining the capacity based effective SNR; and a second component that employs the capacity based effective SNR to facilitate scheduling transmissions, providing power control commands and/or predicting a transmission supporting rate, wherein the first component is configured to determine the capacity based effective SNR as follows $$C(SNR_{eff}) = \frac{1}{N} \sum_{i=1}^{N} C(SNR_i),$$

wherein, $SNR_{eff} = C^{-1}(1/N \ldots ),$

SNR$_i$ is the SNR of the it modulation symbol;

C( ) is the constrained capacity function corresponding to the modulation scheme; and N is the total number of modulated symbols.

4. A system that facilitates wireless communication, comprising:

a first component that determines a capacity based effective signal-to-noise ratio (SNR); a filter bank with a plurality of filters that are utilized to facilitate determining the capacity based effective SNR; and a second component that employs the capacity based effective SNR to facilitate scheduling transmissions, providing power control commands and/or predicting a transmission supporting rate, wherein the first component is configured to determine the capacity based SNR as follows:

$$C(SNR_{eff}) = \frac{1}{N} \sum_{i=1}^{N} C(SNR_i / backoff),$$

wherein, $SNR_{eff} = C^{-1}(1/N \ldots ),$

SNR$_i$ is the SNR of the ith modulation symbol;

backoff accounts for coding loss;

C( ) is the constrained capacity function corresponding to the modulation scheme; and;

N is the total number of modulated symbols.

5. A system that facilitates wireless communication, comprising:

a first component that determines a capacity based effective signal-to-noise ratio (SNR); a filter bank with a plurality of filters that are utilized to facilitate determining the capacity based effective SNR; and a second component that employs the capacity based effective SNR to facilitate scheduling transmissions, providing power control commands and/or predicting a transmission supporting rate, wherein a filter is selected from the filter bank as a function of an accuracy of the capacity based effective SNR measurement and a maximum Doppler frequency at which a base station desires to respond to an instantaneous fade realization.

6. A wireless communication system, comprising:

means for determining a capacity-based effective SNR for a forward and/or reverse link;

means for comparing the capacity based effective SNR to a target effective SNR, wherein an up command is sent if the capacity based effective SNR is less than the target effective SNR and a down command is sent otherwise;

means for utilizing the capacity-based effective SNR to facilitate scheduling mobile terminal transmissions, providing power control commands and/or predicting a supporting transmission rate; and means for computing the capacity based effective SNR as follows:

$$C(SNR_{eff}) = \frac{1}{N} \sum_{i=1}^{N} C(SNR_i),$$

wherein, $SNR_{eff} = C^{-1}(1/N \ldots ),$

SNR$_i$ is the SNR of the ith modulation symbol;

C( ) is the constrained capacity function corresponding to the modulation scheme; and;

N is the total number of modulated symbols.

7. A wireless communication system, comprising:

means for determining a capacity-based effective SNR for a forward and/or reverse link;

means for comparing the capacity based effective SNR to a target effective SNR, wherein an up command is sent if the capacity based effective SNR is less than the target effective SNR and a down command is sent otherwise; and means for utilizing the capacity-based effective SNR to facilitate scheduling mobile terminal transmissions, providing power control commands and/or predicting a supporting transmission rate; and means for computing the capacity based effective SNR as follows:

$$C(SNR_{eff}) = \frac{1}{N} \sum_{i=1}^{N} C(SNR_i / backoff),$$

wherein, $SNR_{eff} = C^{-1}(1/N \ldots ),$

SNR$_i$ is the SNR of the ith modulation symbol;

backoff accounts for coding loss;

C( ) is the constrained capacity function corresponding to the modulation scheme; and;

N is the total number of modulated symbols.

8. A computer-readable medium having computer-executable instructions for facilitating wireless communication, comprising:

receiving information associated with a forward link at a mobile terminal;

determining a capacity based effective SNR from the received information; comparing the capacity based effective SNR to a target effective SNR, wherein an up command is sent if the capacity based effective SNR is less than the target effective SNR and a down command is sent otherwise;

utilizing the capacity based effective SNR to facilitate wireless communication; and determining the capacity based effective SNR as follows:

$$C(SNR_{\mathit{eff}}) = \frac{1}{N}\sum_{i=1}^{N} C(SNR_i),$$

wherein, $SNR_{\mathit{eff}} = C^{-1}(1/N\ldots),$

SNR$_i$ is the SNR of the ith modulation symbol; and

C( ) is the constrained capacity function corresponding to the modulation scheme; and;

N is the total number of modulated symbols.

9. A computer-readable medium having computer-executable instructions for facilitating wireless communication, comprising:

receiving information associated with a forward link at a mobile terminal;

determining a capacity based effective SNR from the received information; comparing the capacity based effective SNR to a target effective SNR, wherein an up command is sent if the capacity based effective SNR is less than the target effective SNR and a down command is sent otherwise;

utilizing the capacity based effective SNR to facilitate wireless communication; and determining the capacity based effective SNR as follows:

$$C(SNR_{\mathit{eff}}) = \frac{1}{N}\sum_{i=1}^{N} C(SNR_i / backoff),$$

wherein, $SNR_{\mathit{eff}} = C^{-1}(1/N\ldots),$

SNR$_i$ is the SNR of the ith modulation symbol;

backoff accounts for coding loss; and

C( ) is the constrained capacity function corresponding to the modulation scheme; and;

N is the total number of modulated symbols.

* * * * *